Figure 1:
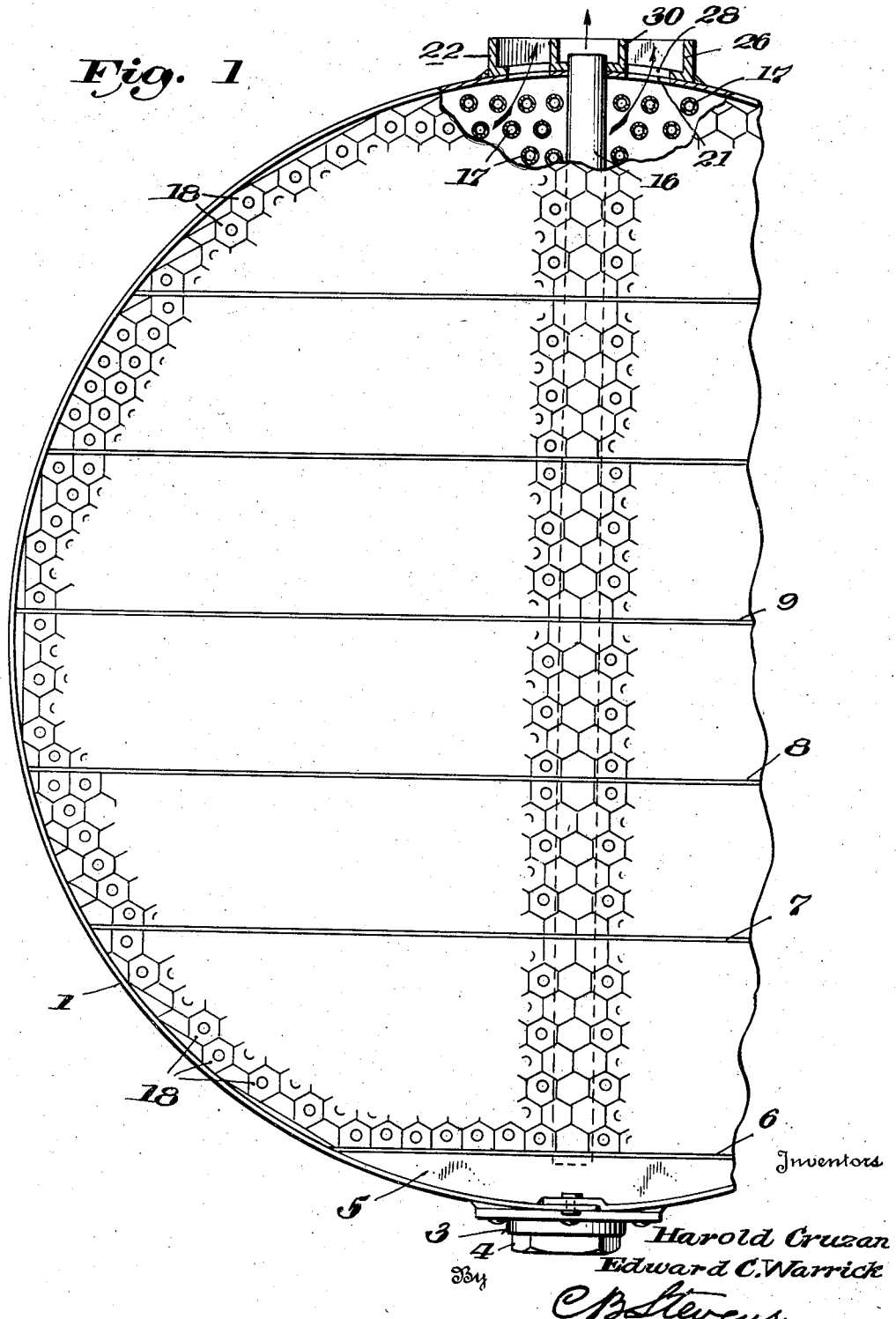

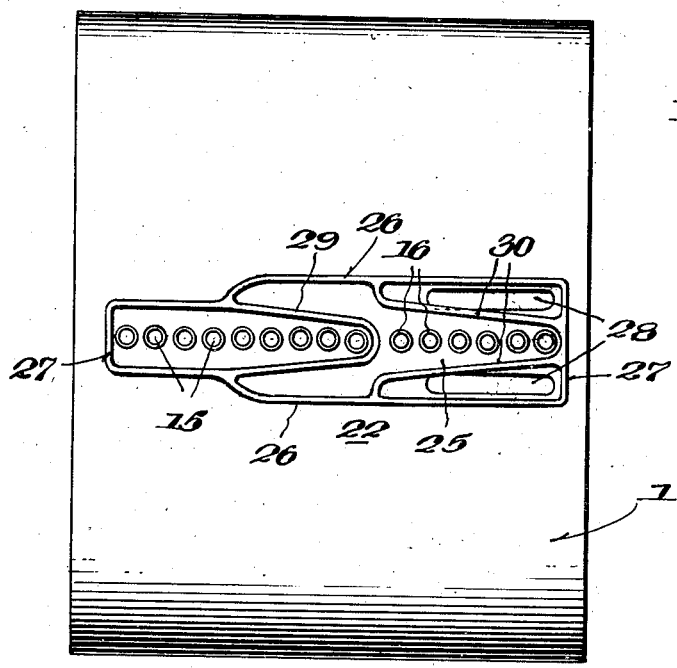
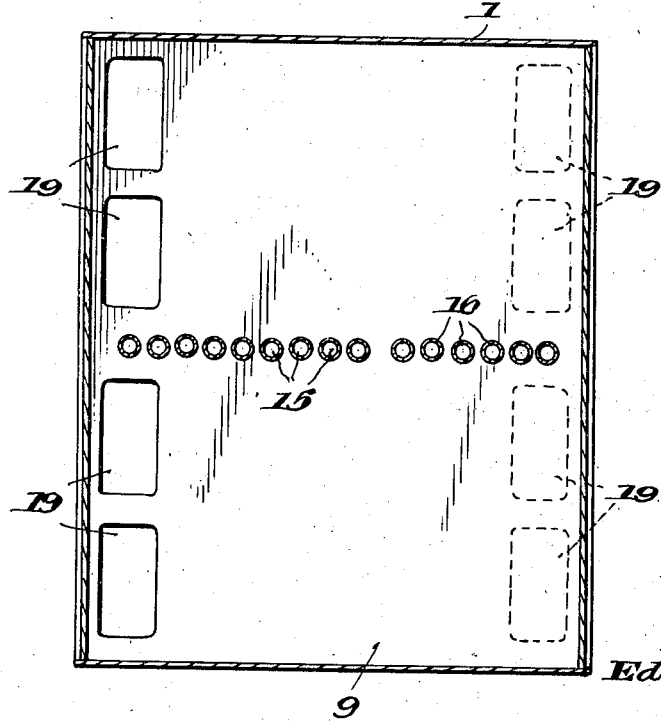

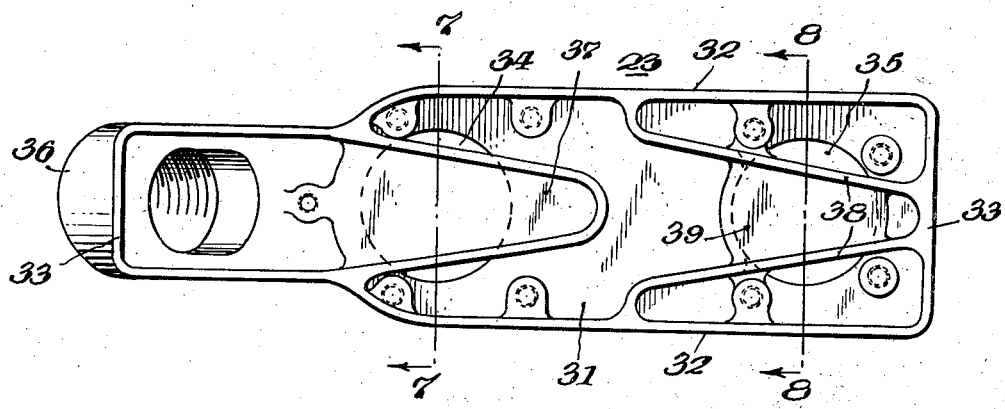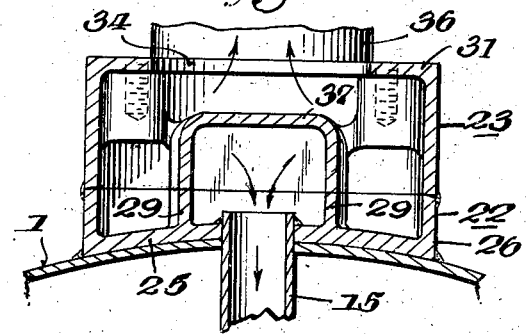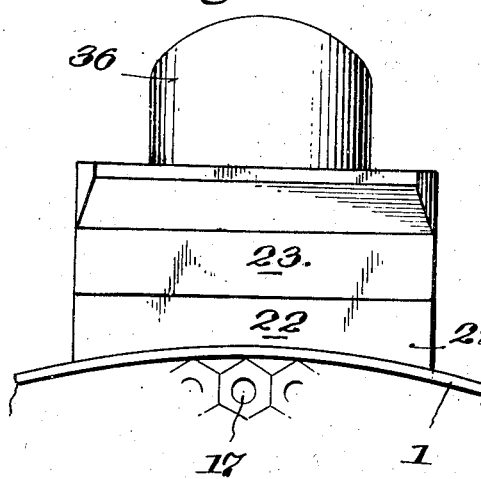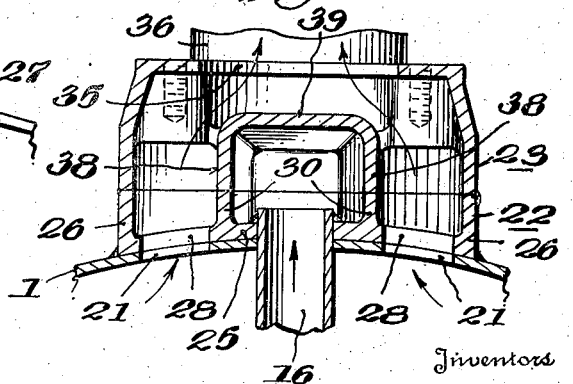

Patented Aug. 20, 1946

2,406,203

UNITED STATES PATENT OFFICE 2,406,203

AUTOMATIC OIL CONDITIONER

Harold Cruzan and Edward C. Warrick, Dayton, Ohio, assignors to United Aircrafts Products, Inc., Dayton, Ohio, a corporation of Ohio Application August 22, 1942, Serial No. 455,820

12 Claims. (Cl. 257—2)

This invention relates to an automatic oil conditioner and more particularly to an apparatus for regulating the temperature of lubricants and thereby controlling the flow thereof in pressure systems for lubricating the power plants of aircraft, armored vehicles or other conveyances, although the same is not restricted to such specific use.

Low atmospheric temperatures cause an increase in viscosity of the lubricant and consequently a rapid build-up of pressure in the system far beyond normal requirements necessary to move the lubricant therethrough, which frequently results in considerable damage to if not total failure of the system.

Under certain conditions, such as in modern warfare, it is vitally important that the power plants of the various vehicles or conveyances be ready for instantaneous use regardless of the condition of the lubricant, due to atmospheric temperature changes. This is particularly important when it becomes necessary to place an aircraft into immediate operation from a so-called cold start in freezing or sub-freezing temperatures.

Another situation where the condition of a lubricant is of vital importance is in the operation of dive bombing. In this operation the dive is often started at extremely high altitudes with the motor cut out resulting in a cooling of the lubricant and consequently a rapid increase in the viscosity thereof. When the operator reaches a point where it is necessary to pull-out of the dive a sudden starting of the motor places the lubricant in the system under sudden and extremely high pressure which also quite often results in considerable damage and failure of the oil line.

In order to overcome the foregoing and other objections and disadvantages which are frequently encountered at the present time, it is the primary or important object of this invention to provide an apparatus of the above character which will automatically and rapidly condition a lubricant, as to viscosity, regardless of varying temperature changes before the same is forced through the system.

Another important object of this invention is to provide an apparatus of the above character which will automatically prevent the flow of lubricant through the system until the same has been brought to a predetermined condition of viscosity.

Another important object of this invention is to provide an apparatus of the above character which will automatically prevent the application of excessive pressure to the lubricating system.

Another important aim of this invention is to provide an apparatus of the above character in which a lubricant is brought to a predetermined condition as to viscosity through a direct and indirect exchange of heat.

A further important object of this invention is to provide an apparatus of the above character in which the lubricating system is positively protected from damage resulting from high pressures therein, by substantially eliminating the sudden pressure drop which usually occurs in similar devices of present day use.

A still further important object of this invention is to provide an apparatus of the above character which is of simple construction, highly efficient in use, and one that can be readily and quickly manufactured and installed at a reasonable cost.

Figure 2:
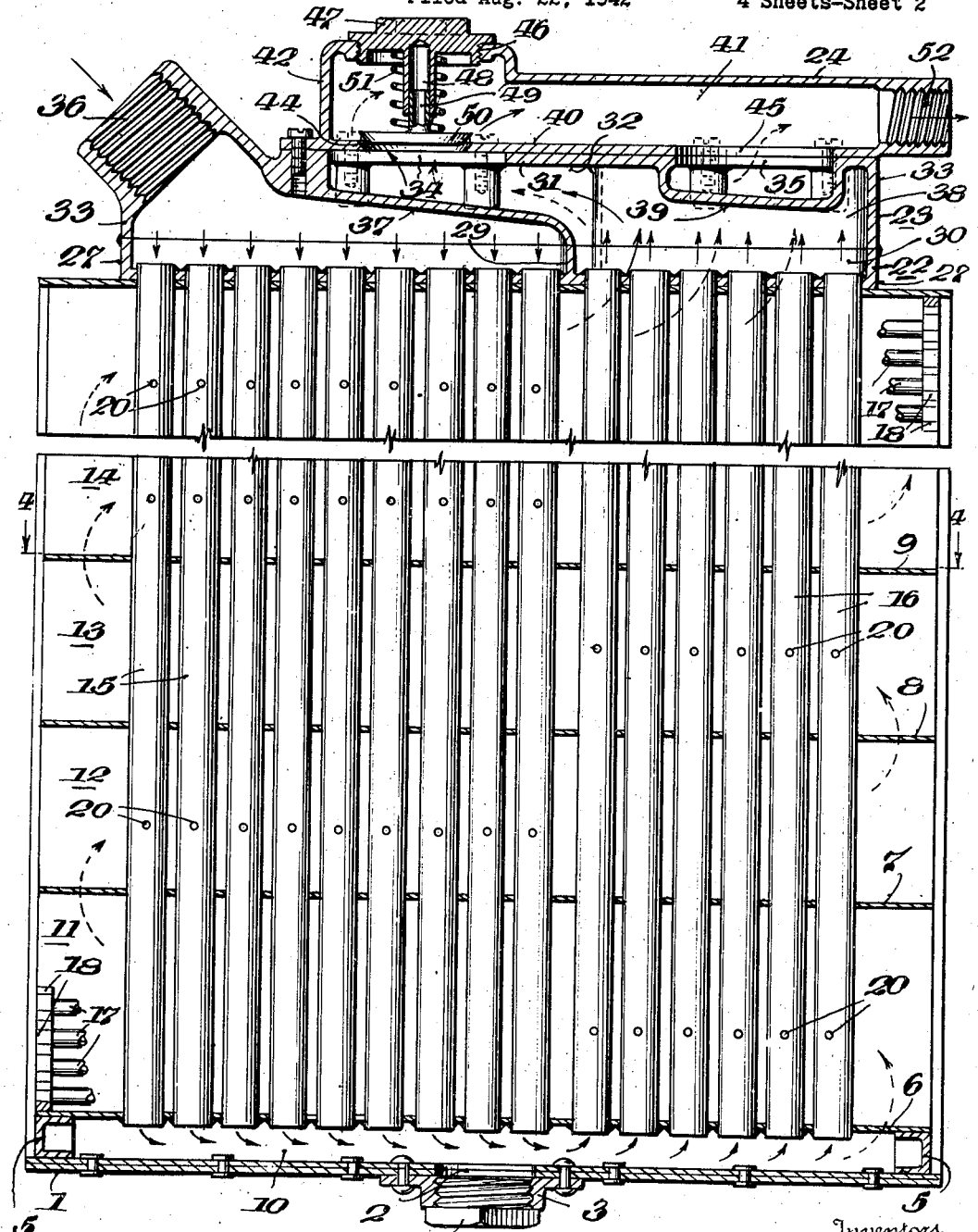

The foregoing and additional objects and advantages will be readily apparent throughout the course of the following description and drawings, in which Figure 1, is a fragmentary end elevation of the invention, partly in section, and with a portion of the fluid distributing head removed, as viewed from the right of Figure 2, Figure 2, is a vertical cross sectional view of the same, with parts broken away, Figure 3, is a top plan view of the conditioner, on a reduced scale, with a portion of the fluid distributing head removed to show the inlet and outlet warm-up tubes, Figure 4, is a horizontal cross-sectional view of the oil conditioner, also on a reduced scale, taken on line 4—4 of Figure 2, Figure 5, is a bottom plan view of one portion of the fluid distributing head, Figure 6, is an end elevation of the fluid distributing head, as viewed from the right of Figure 2, with parts of the oil conditioner broken away, Figure 7, is a vertical cross-sectional view of a portion of the fluid distributing head, taken on line 7—7 of Figure 5, showing fragmentary parts of the oil conditioner and inlet warm-up tubes connected thereto, and Figure 8, is a vertical cross-sectional view, similar to Figure 7, taken on line 8—8 of Figure 5, showing a fragmentary section of one of the outlet warm-up tubes.

Referring in detail to the drawings, the automatic oil conditioner includes a horizontally disposed cylindrical casing 1, having its bottom portion formed with an aperture 2 located intermediate the ends thereof. Secured to the external face of the casing and surrounding the aperture 2 is a flanged ring 3 formed to detachably receive a threaded drain plug 4.

Integrally fastened to the inner surface of the bottom portion of the casing, adjacent each of its ends, as by silver solder, welding or the like, is an inwardly facing channeled supporting member 5 having a flat top and a curved bottom to conform to the curvature of the casing.

Mounted within the casing 1, is a series of vertically spaced and axially extending baffle plates 6, 7, 8 and 9. The lowermost baffle plate 6 of the series, has its end portions seated upon and connected to the supporting members 5, and its longitudinal side edges connected to the casing, so as to provide a lower header or compartment 10, while the baffles 7, 8 and 9 have their longitudinal side edges connected to the casing so as to provide compartments or chambers 11, 12, 13 and 14. While only four horizontally extending baffle plates are shown, it is to be understood that any desirable number may be used.

The baffle plates and the top of the casing are each provided with a horizontally extending centrally disposed row of spaced openings in vertical alinement or registry with each other so as to receive a bank or group of inlet warm-up tubes 15 and a bank or group of outlet warm-up tubes 16. The upper ends of the warm-up tubes terminate a slight distance above the top of the casing for a purpose to be hereinafter more fully described, while lower ends thereof extend a slight distance into the header 10.

Mounted within the casing between the baffle plates and to either side of the warm-up tubes are a plurality of open ended tubes 17 for the passage of air or other coolant. The flared ends 18 of the tubes are substantially hexagonal shaped and are connected together by silver solder or the like to prevent the escape of lubricant through the ends of the casing between the tubes while permitting the passage of the lubricant around the tubes in heat exchange relationship therewith.

The baffle plates are each provided at one of their ends with a transversely extending row of spaced elongated openings 19, which are offset or staggered with respect to the similar openings in the next adjacent plate or plates so as to provide a zig-zag or otherwise tortuous path for a lubricant flowing through the casing.

The inlet and outlet warm-up tubes 15 and 16 are each further provided with a plurality of perforations 20, whereby a portion of the lubricant flowing through the inlet and outlet warm-up tubes will be admitted at spaced points to the main body of the lubricant within the casing.

The top of the casing 1 is also provided with an elongated opening 21, to either side of and adjacent to the outlet warm-up tubes and are off-set with respect to the similarly shaped openings in the uppermost baffle plate (Figure 8).

A lubricant distributing head is securely mounted upon the top of the casing 1, and includes a base section 22, an intermediate section 23, and a top or cover section 24.

The base section 22 of the distributing head is in the form of a substantially rectangular relatively shallow pan-like body having a bottom wall 25, side walls 26, and end walls 27. The bottom wall 25 is provided with a longitudinally arranged row of spaced openings into which the upper ends of the warm-up tubes extend, the latter being connected to the base section 22 by a silver solder, welding or the like. The bottom of the base section is further formed with a pair of spaced openings 28 corresponding to and in vertical registry with the openings 21 in the casing (Figure 8).

Formed integral with the bottom and side walls of the base section so as to separate the upper ends of the inlet and outlet tubes from each other is a vertically extending partition 29 (Figure 3) of substantially V-form when viewed in plan. Disposed on either side of the upper ends of the outlet warm-up tubes 16 is a vertical partition 30, formed integral with the bottom, side and end walls of the base section so as to separate the outlet warm-up tubes from the elongated openings 28 which latter have direct communication with the main body of the lubricant contained within the casing.

The intermediate section 23 of the lubricant distributing head, when viewed in bottom plan as depicted in Figure 5 of the drawings, includes a top wall 31, side walls 32 and end walls 33. The top wall 31 is formed with a pair of spaced outlet ports 34 and 35, while one end wall 33 is formed with a ported neck 36 to provide an inlet passage for the lubricant flowing into the conditioner.

Formed integral with the intermediate section and overlying a portion of the warm-up tubes, is a substantially horizontally extending downwardly facing cup-like partition 37. The top wall of the partition 37 is arranged to lie in a position intermediate the top wall 31 and the bottom edge of the intermediate section and has its side walls and bottom edge of substantially V formation so as to merge with and form a continuation of the partition 29 carried by the base section, to thereby provide separate passages for the lubricant flowing into and out of the conditioner.

At its opposite end the intermediate section is provided with a pair of dependent inwardly divergent partitions 38 connected to the side and end walls 32 and 33 respectively, which form vertical continuations of the partitions 30 formed in the base section. Formed integral with the top wall 31 and connecting the partitions 38 so as to underlie the outlet port 35 is a horizontal partition 39 which forms together with the top wall and the divergent partitions 38 a barrier which prevents the direct passage of lubricant from the outlet warm-up tubes 16 to and through the outlet port 35. Otherwise stated, any lubricant flowing upwardly through the warm-up tubes 16 will be directed by the divergent partitions 38 and the horizontal partition 39 toward and through the outlet port 34.

Detachably secured upon the intermediate section 23 is the top or cover section 24 formed to provide a bottom wall 40, side walls 41, end walls 42 and top wall 43. The bottom wall 40 is formed with a pair of openings 44 and 45 to respectively register with the outlet ports 34 and 35 of the intermediate section 23, the port 34 being tapered to provide a valve seat. The top wall 43 is provided with an opening 46 in vertical register with the opening 34, 44 and is formed to detachably receive a threaded plug 47 having a downwardly opening sleeve 48 formed integral therewith.

Slidably mounted within the sleeve 48 is the stem 49 of a valve 50. When the plug 47 is secured within the opening 46, the valve 50 is normally and yieldably held upon its seat by means of a coil spring 51 of a strength to exert a predetermined closing pressure upon the valve. In lieu of a spring biased relief valve, a thermostatic valve, not shown, may be used.

The top or cover section is further provided with a lubricant outlet 52 formed in one of its end walls 42. Ordinarily, in the pressure systems in use at the present time for lubricating aircraft or other engines developing high speeds, the oil is pumped from a reservoir to the various parts of the engine to be lubricated and then returned to the reservoir by means of a second or scavenge pump.

In the event it is necessary to place the engine in operation when the lubricant is highly viscous or frozen, such condition imposes an excessive pressure upon the return line with the result that serious damage may be done to the entire system.

In order to overcome any damage which might result from the highly viscous state of the lubricant under normal operating conditions, as set forth, it is proposed to place the automatic oil conditioner forming the subject matter of this application in the oil return conduit, between the scavenge pump and the reservoir, through the inlet and outlet ports 36 and 52 respectively.

In operation, lubricant under pressure is forced into the fluid distributing head through the inlet 36 as indicated by the arrow in Figure 2. If the lubricant is highly viscous or congealed, the pressure necessary to force the same between the horizontally disposed coolant tubes 17, is greater than that required to force the lubricant through the warm-up tubes 15 and 16. In this event, the lubricant flows downwardly through the inlet warm-up tube 15 into the lower compartment or header 18, through the latter and thence upwardly through the outlet warm-up tubes 16, in the direction of the solid arrows, toward and against the valve 50. If the pressure is greater than that necessary to force the lubricant in the core or main body of the conditioner between the horizontally disposed tubes 17, the valve 50 will be forced open allowing the lubricant to be returned to the reservoir through the outlet port 52. In the case of a thermostatic valve, the combined pressure and temperature of the lubricant will open the valve to permit the passage thereof to the outlet port 52. At this point it is to be particularly noted that the perforations or by-passes 20, which are preferably provided on each side of each of the tubes, permits the warm or hot lubricant flowing through the tubes 15 and 16 to be directly diffused through the lubricant in the main body of the conditioner regardless of whether the lubricant contained therein is highly viscous or not. Thus in the event the lubricant in the main body of the conditioner is highly viscous, the tubes 15 and 16 act as warm-up passes as well as passes having less restriction to flow. Flow of lubricant through these tubes warms up the lubricant in the main body of the conditioner by direct diffusion as well as by heat transfer through the tube walls, such warm-up of the lubricant continuing until the pressure necessary to force the lubricant in the zig-zag or tortuous path, through the core is less than that necessary to overcome the resistance of the valve 50, regardless of whether the same is spring biased or of the thermostatic type. At this time, instead of the lubricant flowing upwardly through the tubes 16 as hereinbefore described, same will flow downwardly through the tubes 15, into and through the header 18 and thence, will follow a zig-zag or tortuous path back and forth across the length of the conditioner through the baffled sections and passages 21—28, 35—45, as indicated by the dotted arrows, to the outlet port 52 leading to the reservoir.

It will be seen from the foregoing, that a decided advantage has been obtained, in that the normal warm-up time of the conditioner and the time of starting the flow of lubricant either through the warm-up tubes and/or the main body thereof, has been greatly reduced, thus affording immediate and efficient lubrication of the engine, regardless of atmospheric temperature changes under all operating conditions.

It is to be understood that the form of the invention herewith shown and described is to be taken as a preferred example of the same, and that various changes in the shape, size and arrangement of parts may be resorted to, without departing from the spirit of our invention, or the scope of the subjoined claims.

Having thus described our invention, we claim:

1. An apparatus for automatically controlling the viscosity of a liquid which is subjected to varying temperature changes, including a casing having an outlet, a plurality of open-ended tubes within the casing for the passage of a coolant therethrough and for the passage therearound of the liquid to be controlled, a plurality of inlet and outlet warm-up tubes in the casing and spaced apart so that the liquid can flow between them exteriorly, the ends of which warm-up tubes are open, and the lower ends being spaced from the casing bottom and having communication with the casing, a liquid distributing head having an inlet and an outlet carried by the casing and overlying the warm-up tubes and casing outlet and in communication therewith, said distributing head having a passage for the liquid flowing from the outlet warm-up tubes to the outlet of said head and a second passage for the liquid flowing from the casing to the outlet of said head, and valve means disposed within the first-named liquid passage of the distributing head and biased to closed position to control the passage of liquid therethrough.

2. An apparatus for automatically controlling the viscosity of a liquid which is subjected to varying temperature changes, including a casing having an outlet, a plurality of open-ended tubes within the casing for the passage of a coolant therethrough and for the passage therearound of the liquid to be controlled, a plurality of inlet and outlet warm-up tubes in the casing, and spaced apart so that the liquid can flow between them exteriorly, the ends of which warm-up tubes are open, and the lower ends being spaced from the casing bottom and having communication with the casing, liquid distributing means having an inlet and an outlet carried by the casing and overlying the warm-up tubes and casing outlet and in communication therewith, said distributing means having a passage for the liquid flowing from the outlet warm-up tubes to the outlet of said means and a second passage for the liquid flowing from the casing to the outlet of said means, and means disposed within the first-named liquid passage of the distributing means and biased to closed position to control the passage of liquid therethrough.

3. An apparatus for automatically controlling the viscosity of a liquid which is subjected to varying temperature changes, including a casing having an outlet, a plurality of open-ended tubes within the casing for the passage of a coolant therethrough and for the passage therearound of the liquid to be controlled, a plurality of inlet and outlet warm-up tubes in the casing and spaced apart so that the liquid can flow between them exteriorly, the ends of which warm-up tubes are open, and the lower ends being spaced from the casing bottom and having communication with the casing, said warm-up tubes each being formed with a plurality of spaced lateral openings in communication with the casing, a liquid distributing head having an inlet and an outlet carried by the casing and overlying the warm-up tubes and casing outlet and in communication therewith, said distributing head having a passage for the liquid flowing from the outlet warm-up tubes to the outlet of said head and a second passage for the liquid flowing from the casing to the outlet of said head, and valve means disposed within the first-named liquid passage of the distributing head and biased to closed position to control the passage of liquid therethrough.

4. An apparatus for automatically controlling the viscosity of a liquid which is subjected to varying temperature changes, including a casing having an outlet, a plurality of open-ended tubes within the casing for the passage of a coolant therethrough and for the passage therearound of the liquid to be controlled, a plurality of inlet and outlet warm-up tubes in the casing and spaced apart so that the liquid can flow between them exteriorly, the ends of which warm-up tubes are open, and the lower ends being spaced from the casing bottom and having communication with the casing, said warm-up tubes each being formed with a plurality of spaced lateral openings in communication with the casing, a liquid distributing means having an inlet and an outlet carried by the casing and overlying the warm-up tubes and casing outlet and in communication therewith, said distributing means having a passage for the liquid flowing from the outlet warm-up tubes to the outlet of said means and a second passage for the liquid flowing from the casing to the outlet of said means, and means disposed within the first-named liquid passage of the distributing means and biased to closed position to control the passage of liquid therethrough.

5. An apparatus for automatically controlling the viscosity of a liquid which is subjected to varying temperature changes, including a casing having an outlet, a plurality of open-ended tubes within the casing for the passage of a coolant therethrough and for the passage therearound of the liquid to be controlled, a plurality of inlet and outlet warm-up tubes in the casing disposed centrally of the coolant tubes and angularly disposed relative to the latter, the ends of which warm-up tubes are open, and the lower ends being spaced from the casing bottom and having communication with the casing, said warm-up tubes being spaced apart so that the liquid can flow between them exteriorly, a liquid distributing head having an inlet and an outlet carried by the casing and overlying the warm-up tubes and casing outlet and in communication therewith, said distributing head having a passage for the liquid flowing from the outlet warm-up tubes to the outlet of said head and a second passage for the liquid flowing from the casing to the outlet of said head, and valve means disposed within the first-named liquid passage of the distributing head and biased to closed position to control the passage of liquid therethrough.

6. An apparatus for automatically controlling the viscosity of a liquid which is subjected to varying temperature changes, including a casing having an outlet, a plurality of open-ended tubes within the casing for the passage of a coolant therethrough and for the passage therearound of the liquid to be controlled, a plurality of inlet and outlet warm-up tubes in the casing disposed centrally of the coolant tubes and angularly disposed relative to the latter, the ends of which warm-up tubes are open, and lower ends being spaced from the casing bottom and having communication with the casing, said warm-up tubes being spaced apart so that the liquid can flow between them exteriorly, liquid distributing means having an inlet and an outlet carried by the casing and overlying the warm-up tubes and casing outlet and in communication therewith, said distributing means having a passage for the liquid flowing from the outlet warm-up tubes to the outlet of said means and a second passage for the liquid flowing from the casing to the outlet of said means, and means disposed within the first named liquid passage of the distributing means and biased to closed position to control the passage of liquid therethrough.

7. An apparatus for automatically controlling the viscosity of a liquid which is subjected to varying temperature changes including a casing having an outlet, a partition spaced from and connected to the lower portion of the casing to provide a header, said header having an opening in communication with the interior of the casing, a plurality of open-ended tubes within the casing for the passage of a coolant therethrough and for the passage therearound of the liquid to be controlled, a plurality of inlet and outlet warm-up tubes in the casing, and spaced apart so that the liquid can flow between them exteriorly, the ends of which warm-up tubes are open and have their lower ends extending through the partition into the header so as to communicate with the latter, a liquid distributing head having an inlet and an outlet carried by the casing and overlying the warm-up tubes and casing outlet and in communication therewith, said distributing head having a passage for the liquid flowing from the outlet warm-up tubes to the outlet of said head and a second passage for the liquid flowing from the casing to the outlet of said head, and valve means disposed within the first-named liquid passage of the distributing head and biased to closed position to control the passage of liquid therethrough.

8. An apparatus for automatically controlling the viscosity of a liquid which is subjected to varying temperature changes, including a casing having an outlet, spaced conduits within the casing for the passage of a coolant therethrough and for the passage therearound of the liquid to be controlled, a pair of inlet and outlet warm-up conduits in the casing, and spaced apart so that the liquid can flow between them exteriorly, the outer ends of which warm-up conduits are open and the inner ends being spaced from the casing and having communication with the latter, liquid distributing means having an inlet and an outlet carried by the casing and overlying the warm-up conduits and casing outlet and in communication therewith, said distributing means having a passage for the liquid flowing from the outlet warm-up conduits to the outlet of the distributing means and a second passage for the liquid flowing from the casing to the outlet of said means, and means disposed within the first-named liquid passage of the distributing means and biased to closed position to control the passage of liquid therethrough.

9. In an apparatus for automatically controlling the viscosity of liquid which is subjected to varying temperature changes, the combination including a casing, a distributor head mounted on one side of the casing, said head having a plurality of passages including an intake passage and an outlet passage, a plurality of tubes terminating in the intake passage and projecting into the casing so as to terminate in spaced relation from the side of the casing opposite the head, and two spaced groups of open-ended tubes within the casing for the passage of a coolant therethrough and for the passage therearound of the liquid to be controlled, said open-ended tubes being transversely disposed with respect to the first mentioned tubes which are spaced apart so that the liquid can flow between them exteriorly, one group of said open-ended tubes being located on one side of said first mentioned tubes and the other group being located on the other side of said first mentioned tubes.

10. In an apparatus for automatically controlling the viscosity of liquid which is subjected to varying temperature changes, the combination including a casing, a distributor head mounted on one side of the casing, said head having a plurality of passages including an intake passage and an outlet passage, a relief valve mounted in the head, two groups of open-ended tubes for the passage of a coolant through the open-ended tubes and for the passage of a liquid to be controlled around the open-ended tubes, said groups of tubes being mounted in spaced relation from each other within the casing, and a plurality of heater tubes terminating in the intake passage and being transversely disposed with respect to the open-ended tubes, said heater tubes being positioned between the two groups of open-ended tubes and terminating in spaced relation from the side of the casing opposite the head so as to form a passage for the liquid to be cooled from the intake opening to the side of the casing opposite said head, and said heater tubes being spaced apart so that the liquid can flow between them exteriorly.

11. In an apparatus for automatically controlling the viscosity of liquid which is subjected to varying temperature changes, the combination including a cylindrical casing, a distributor head mounted on one side of the casing, said head having a plurality of passages including an intake passage and an outlet passage, a relief valve mounted between two of the passages in the head, two groups of open-ended tubes for the passage of the coolant through the open end of the tubes and for the passage of a liquid to be controlled around the open end of the tubes, said open-ended tubes being mounted in the casing, one group being arranged in spaced relation from the other, a plurality of heater tubes terminating in the intake passage and being transversely disposed with respect to the open-ended tubes, a plurality of heater tubes terminating in the outlet passage also transversely disposed with respect to the open-ended tubes, said heater tubes being located between the group of open-ended tubes and terminating in spaced relation from the side of the casing opposite the head so as to form passages for the liquid to be cooled from the intake opening to the outlet opening, and said heater tubes being spaced apart so that the liquid can flow between them exteriorly.

12. An oil temperature regulator, comprising a casing, a plurality of heat exchange tubes assembled in said casing for the passage of a fluid therethrough as a coolant and for the passage therearound of oil to be cooled, a header chamber at one side of said casing and communicating with the interior thereof, a plurality of tubular conduits extending from outside said casing into said casing and through said assembly of tubes to said header chamber, said conduits being spaced apart so that the oil may flow between them exteriorly, a fitting overlying the outer ends of said tubular conduits and formed with oil inlet and outlet passages and a partition in said fitting effecting a division between said tubular conduits in such wise that some thereof flow oil from said inlet passage to said header chamber and others thereof flow oil from said header chamber to said outlet passage.

HAROLD CRUZAN.
EDWARD C. WARRICK.